Patented May 18, 1926.

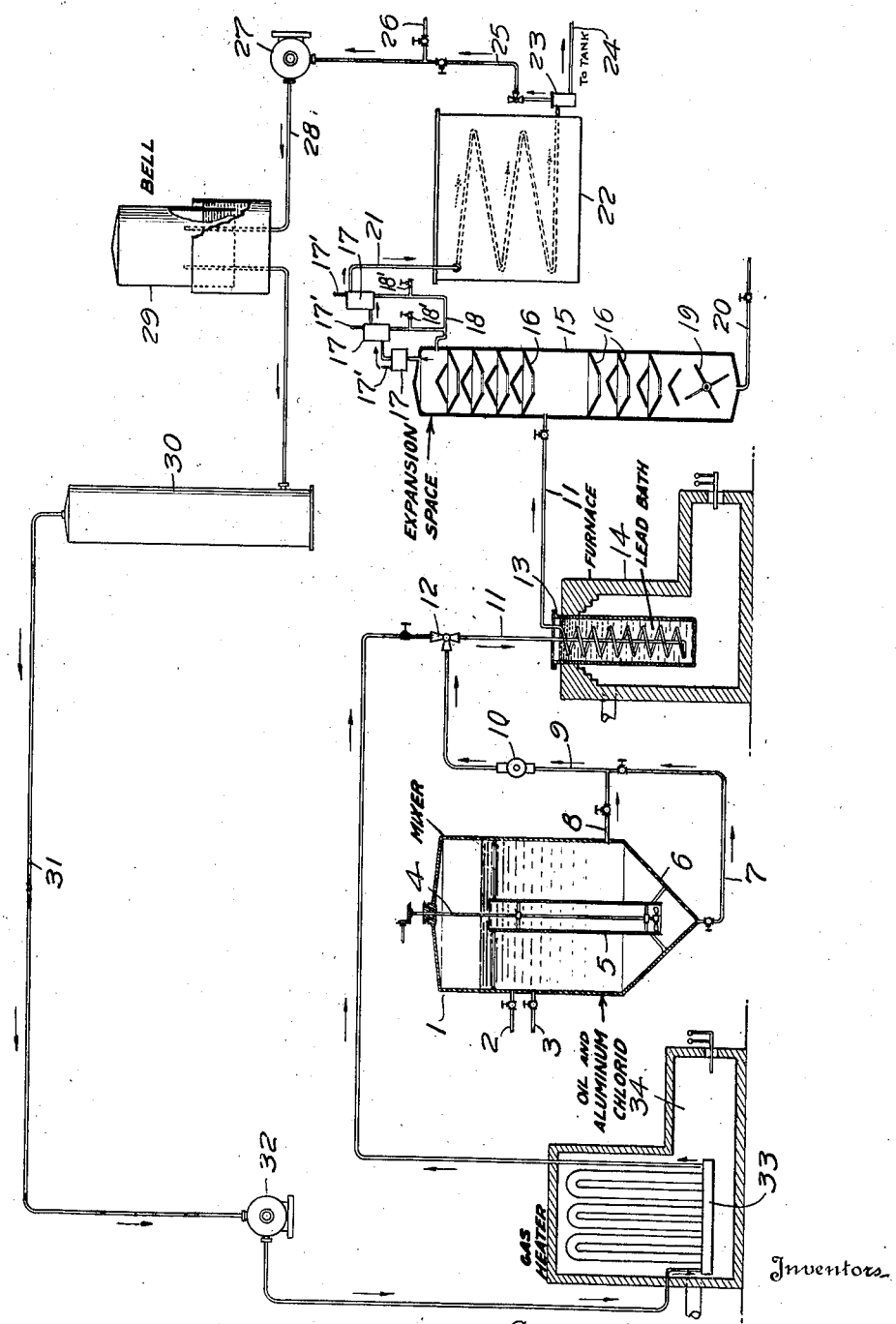

1,585,263

UNITED STATES PATENT OFFICE.

GEORGE L. PRICHARD AND HERBERT HENDERSON, OF PORT ARTHUR, TEXAS, ASSIGNORS TO GULF REFINING COMPANY, OF PITTSBURGH, PENNSYLVANIA, A CORPORATION OF TEXAS.

PROCESS OF CATALYZING OILS.

Application filed February 28, 1922. Serial No. 539,965.

This invention relates to processes of catalyzing oils; and it comprises a method of catalyzing oils with aluminum chlorid and the like wherein a flowing mixture of oil and catalyzer is heated in transit and transferred to an expansion chamber for the release of volatile products of the reaction; all as more fully hereinafter set forth and as claimed.

In one of the methods now in use for the production of gasoline and other light or easily volatile oils from heavier petroleum oils of higher boiling points, the high boiling oil is heated with aluminum chlorid to a temperature at which a chemical reaction takes place, attended with evolution of vapors of new and lower boiling oil. In most embodiments of this process a heavy oil, such as gas oil, is heated under constant agitation with a little aluminum chlorid, using about 5 per cent. In the case of a gas oil initially boiling at about 600° F., the mixture with aluminum chlorid enters into ebullition somewhere around 500° F., giving vapors which on condensation have the character of gasoline. This gasoline may have, and usually does have, an end boiling point very much lower than the initial boiling point of the oil from which it was produced. Distillation with aluminum chlorid is usually continued until the chlorid becomes more or less spent; until its calalytic activity is exhausted to a greater or less extent. At this time it occurs as a sort of heavy sludge which is removed from the distilling vessel and replaced by fresh chlorid.

The operation so far described is continuous as regards the oil in the sense that a still may be kept in operation with occasional replacements of aluminum chlorid for a long time; but it is not continuous as regards the aluminum chlorid. And even as regards the oil, the operation is not quite uniform; the product of the still at any given time depends in large measure upon the age of the charge of aluminum chlorid present.

In the present invention, we have devised a mode of making the whole operation truly continuous, both as regards the oil and as regards the aluminum chlorid. In this invention we produce a mixture of oil with the proper amount of aluminum chlorid and pass this mixture continuously through a suitable heated tubular conduit. In this conduit the mixture is heated to cause the chemical reaction of the aluminum chlorid upon the oil. From the heated conduit the hot mixture is taken into a suitable releasing chamber where the low boiling oils are allowed to flash into vapor. The residual high boiling oils are separated from the aluminum chlorid sludge and each sent to a suitable place of disposition. In order to facilitate the movement of the mixture or magma of aluminum chlorid and oil through the heated zone, we generally employ a jet of gas; this gas being returned uncondensable gas separated from the gasoline beyond the condenser. The gas is in large part really vapors of easily volatile oils (butanes, pentanes, etc.) and by returning it, it is afforded an opportunity to enter into reaction again. It is largely taken up with production of further gasoline.

In the accompanying illustration we have shown, more or less diagrammatically, a complete apparatus embodying the described invention and capable of use in performing the stated process. The view is in elevation, certain parts being shown in vertical section. Oil enters mixer 1 by inlet 2, aluminum chlorid or aluminum chlorid mixed with oil being introduced at 3. The mixer is provided with agitating means 4 comprising a propeller mounted in encircling sleeve 5. Oil and aluminum chlorid are mixed in this device by the agitator and by energetic agitation the mixture may be kept tolerably uniform. There is however a tendency for the aluminum chlorid and some oil to settle at the bottom, leaving oil poorer in aluminum chlorid above it. The bottom of the mixer is, as shown, coned at 6 and is provided with valved drawoff line 7. At a point above the coned bottom is another valved outlet 8. By proper control of the speed of the agitator and of the valves in lines 7 and 8, any desired proportion of oil and aluminum chlorid may be sent forward through conduit 9 by means of pump 10. As shown, the oil and aluminum chlorid are delivered into line 11. In order to assist in sending the mixture forward, and for certain other reasons, a certain amount of hot gas may be delivered into this line by injector 12. Conduit 11 is passed through suitable heating devices adapted to heat the oil and aluminum chlorid in transit to a temperature where the chlorid exercises its catalytic effect upon the oil. As shown, the heating zone comprises a container 13 adapted to hold molten lead or the like and mounted in furnace chamber 14. The lead bath may be omitted and conduit 11 mounted directly in the furnace chamber, the lead bath being an advantage in obtaining definite temperatures. Preferably, the length of the conduit 11 within the heating zone and the rate of passage of the oil-aluminum chlorid mixture therethrough are so correlated as to cause an approximately complete utilization of the catalytic energy of the chlorid. As shown, conduit 11 delivers the heated mixture of oil and aluminum chlorid into a releasing tower 15 provided with internal shelves 16 of the general type of those used in column stills or scrubbers. Within this releasing device the light oils flash into vapors which go forward past the shelves to a system of diagrammatically shown backtraps 17. Volatilized heavy oils and aluminum chlorid or its compounds with oils go back to the releasing chamber through line 18. This line 18 may be provided with a plurality of valves on the lines leading from the backtraps or condensers 17 and the condensates from these condensers 17 may be separately collected. These valved lines are shown as 18′. Each of the backtraps or condensers is provided with a thermometer 17′ for observation of temperature. These backtrap condensers may be water cooled or air cooled and particularly when air cooled their temperature will depend upon the rate of distillation or the volume of vapors in them at any given time. Unvolatilized heavy oils and aluminum chlorid or its residue pass downward over similar shelves to the bottom of the tower. As shown, the bottom of the tower is provided with agitating means 19. Aluminum chlorid sludge and heavy oil are drawn off through valved conduit 20. The light oil vapors passing the backtrap system go by conduit 21 through condenser 22 past trap 23 by exit line 24 to a suitable stock tank (not shown). Uncondensed gases are taken from trap by line 25. Any desired amount may be vented or bled off by valved connection 26 or additional gas such as refinery gas from refinery operations may be added through this line. The residue is taken by fan 27 and line 28 provided with pressure regulating and fluctuation obviating bell 29 to a diagrammatically shown scrubbing tower 30. The bell may be of any desired size and afford any desired reserve capacity. The gas thence goes by lines 31 and pressure pump 32 through heating coils 33 in furnace 34. The heated gas goes by the injector (12) previously mentioned back to the circulation.

What we claim is:—

1. In the catalytic distillation of petroleum oils with aluminum chlorid the process which comprises transmitting a mixture of such an oil with aluminum chlorid once through a heating zone, at a temperature sufficient to cause chemical reaction to occur and allowing the mixture to freely expand in a releasing chamber with extrication of vapors of volatile oils formed by such reaction.

2. In the catalytic distillation of petroleum oils with aluminum chlorid the process which comprises transmitting a mixture of oil and aluminum chlorid in a stream of restricted cross sectional area through a heating zone at a temperature sufficient to cause catalysis of such oil by said chlorid, the length of the stream and the rate of passage being so correlated as to cause an approximately complete utilization of the catalytic energy of said chlorid and discharging the mixture into an expansion chamber to permit extrication of vapors of light oils formed in the catalysis.

3. In the catalytic distillation of petroleum oils with aluminum chlorid the process which comprises transmitting a mixture of oil and aluminum chlorid in a stream of restricted cross sectional area through a heating zone at a sufficient temperature to cause catalytic conversion of said oil by said chlorid, releasing the mixture in an expansion chamber to permit extrication of vapors of light oils formed in the catalysis, condensing said light oils, separating the condensate from residual gases and vapors and returning said residual gases and vapors to the said stream for repassage with a further quantity of oil and chlorid.

4. In the catalytic distillation of petroleum oils with aluminum chlorid the process which comprises transmitting a mixture of such oil with aluminum chlorid through a heating zone at a temperature sufficient to cause chemical reaction to occur, allowing the mixture to expand in a releasing chamber with extrication of vapors of volatile oils formed by such reaction and with removal of gases and vapors of lighter oils than those desired, passing the said gases and vapors of lighter oils to a second heating zone and forcing said heated gases and vapors together with the mixture of oil and aluminum chlorid through the said first heating zone.

5. In the catalytic distillation of petroleum oils with aluminum chlorid the process which comprises transmitting a mixture of such oil with aluminum chlorid through a heating zone at a temperature sufficient to cause chemical reaction to occur, allowing the mixture to expand in a releasing chamber with extrication of vapors of volatile oils formed by such reaction and with removal of gases and vapors of lighter oils than those desired, passing the said gases and vapors of lighter oils to a second heating zone and then using them for injecting the mixture of aluminum chlorid and oil through the said first heating zone.

6. In the catalytic distillation of petroleum oils with aluminum chlorid, the process which comprises transmitting a mixture of oil and aluminum chlorid once through a heating zone at a temperature sufficient to cause catalytic conversion of said oil by said chlorid, releasing the mixture in an expansion chamber to permit extrication of vapors of light oils formed in the catalysis, condensing said vapors of light oils, and collecting liquid hydrocarbon and aluminum chlorid in the lower portion of said expansion chamber.

7. In the catalytic distillation of petroleum oils with aluminum chlorid, the process which comprises transmitting a liquid mixture of such an oil with aluminum chlorid and a hydrocarbon gas through a heating zone at a temperature sufficient to cause chemical reaction to occur, and allowing the mixture to expand in a releasing chamber with extrication of vapors of volatile oils formed by such reaction.

8. In the catalytic distillation of petroleum oils with aluminum chlorid, the process which comprises transmitting a liquid mixture of such an oil with aluminum chlorid through a heating zone at a temperature sufficient to cause chemical reaction to occur, facilitating the movement of said mixture through said conduit by jetting a gas into the mixture passing through said conduit, and allowing the mixture to expand in a releasing chamber with extrication of vapors formed by such reaction.

9. In the catalytic distillation of petroleum oils with aluminum chlorid, the process which comprises transmitting a liquid mixture of such an oil with aluminum chlorid through a heating zone at a temperature sufficient to cause chemical reaction to occur, jetting a hydrocarbon gas into the mixture passing through said conduit to facilitate its movement therethrough and to enter into the reaction, and allowing the mixture to expand in a releasing chamber with extrication of vapors formed by such reaction.

10. In the catalytic distillation of petroleum oils with aluminum chlorid, the process which comprises mixing oil with aluminum chlorid in a mixing chamber, removing oil and aluminum chlorid mixture from the bottom of said chamber and also from a point intermediate the top and bottom of said chamber, transmitting the mixture through a heating zone at a temperature sufficient to cause chemical reaction to occur, and allowing the mixture to expand in a releasing chamber with extrication of vapors formed by such reaction.

In testimony whereof we have hereunto signed our names at Port Arthur, Texas, this 25th day of February, 1922.

GEORGE L. PRICHARD.
HERBERT HENDERSON.